US006659483B2

(12) United States Patent
Blythe

(10) Patent No.: US 6,659,483 B2
(45) Date of Patent: Dec. 9, 2003

(54) TELESCOPING BICYCLE FENDER

(76) Inventor: Simon Blythe, 45577 Spadina Avenue, Chilliwack, British Columbia (CA), V2V 2V2

( * ) Notice: Subject to any disclaimer, the term of this patent is extended or adjusted under 35 U.S.C. 154(b) by 0 days.

(21) Appl. No.: 10/024,031

(22) Filed: Dec. 21, 2001

(65) Prior Publication Data

US 2003/0116937 A1 Jun. 26, 2003

(51) Int. Cl.[7] .......................... B62D 25/16; B62D 25/18
(52) U.S. Cl. ................... 280/152.3; 280/152.1
(58) Field of Search .................... 280/152.1, 152.2, 280/152.3, 152.05, 847, 851, 852, 160, 160.1; 293/105; 296/78.1

(56) References Cited

U.S. PATENT DOCUMENTS

| | | | | |
|---|---|---|---|---|
| 617,836 A | * | 1/1899 | Peterson | 280/152.3 |
| 741,997 A | * | 10/1903 | Beckwith | 280/152.3 |
| 1,112,478 A | * | 10/1914 | Roderick | 280/152.3 |
| 1,226,323 A | * | 5/1917 | Fialkowski | 280/152.3 |
| 1,266,251 A | * | 5/1918 | Green | 280/152.1 |
| 1,577,146 A | * | 3/1926 | Pawsat | 280/152.1 |
| 4,319,763 A | * | 3/1982 | White | 280/152.3 |
| 4,620,713 A | * | 11/1986 | Sakaguchi | 280/152.3 |
| 5,026,083 A | | 6/1991 | Wendorf | |
| 5,120,073 A | | 6/1992 | Sealy, Jr. | |
| 5,121,935 A | * | 6/1992 | Mathieu et al. | 280/152.3 |
| 5,165,712 A | | 11/1992 | Fuller | |
| 5,489,108 A | | 2/1996 | Slade | |
| 5,700,022 A | * | 12/1997 | Finnson | 280/152.3 |
| 5,899,473 A | * | 5/1999 | Mackenzie | 280/152.3 |
| 5,924,715 A | | 7/1999 | Norem | |
| 6,029,988 A | * | 2/2000 | Edwards | 280/152.2 |
| 6,199,883 B1 | | 3/2001 | Gable | |

FOREIGN PATENT DOCUMENTS

| | | | | |
|---|---|---|---|---|
| CA | 2015086 | | 10/1991 | |
| DE | 4232687 A1 | * | 3/1994 | B62J/15/04 |
| FR | 2620102 A | * | 3/1989 | B62J/15/02 |
| FR | 2633890 A1 | * | 1/1990 | B62J/15/02 |
| FR | 2646394 A1 | * | 11/1990 | B62J/15/02 |
| WO | WO 8904271 A1 | * | 5/1989 | B62J/15/00 |

* cited by examiner

*Primary Examiner*—Brian L. Johnson
*Assistant Examiner*—Kelly E Campbell
(74) *Attorney, Agent, or Firm*—Oyen Wiggs Green & Mutala

(57) ABSTRACT

A telescoping bicycle fender for use on the rear wheel of a bicycle can be easily and quickly mounted and removed. The fender has three sliding sections which can be telescoped between a compact position in which the sections are nested together and an extended position in which the sections are telescoped out to extend around a substantial part of the wheel.

9 Claims, 6 Drawing Sheets

TELESCOPING BICYCLE FENDER

TECHNICAL FIELD

This invention pertains to bicycle fenders and, in particular, to a telescoping bicycle fender which can be rapidly installed and removed and which telescopes between a compact position and a fully extended position.

BACKGROUND OF THE INVENTION

Bicycle fenders, particularly those used on the rear wheel of the bicycle, provide useful protection to the rider against the tire spray that occurs in wet or muddy driving conditions. A full, permanently-mounted fender, where the fender extends around substantially 180 degrees of the wheel circumference, provides complete spray protection, but such a system restricts a bike in the type of terrain on which it can be used. For example, mud, sticks and rocks can easily damage and clog these fenders, making bikes having such a fender suitable only for use on roads and mild off-road trails. A rider's desire to reduce the weight and wind resistance of a bike, and simply the modern styling preference in bicycles, are other reasons to avoid full fenders.

Fenders which provide only partial spray protection to the rider are used on some bikes. Such partial fenders often extend generally horizontally over the rear wheel from behind the bicycle saddle. Partial fenders may be permanently installed or have a snap-on means of attachment so they can be quickly attached and removed. However, such fender systems do not provide complete rider protection from tire spray.

SUMMARY OF INVENTION

It is an object of the invention to provide a bicycle fender which provides rider protection generally equivalent to that of a full, permanent fender but which can be easily and quickly mounted on and removed from the bicycle.

It is a further object of the invention to provide a telescoping bicycle fender which, when mounted on a bicycle frame, can be telescoped between a compact position in which the fender sections are nested together, and an extended position, in which the sections are telescoped out to extend around a substantial part of the wheel. The nesting of the telescoping sections permits the fender system to have a manageable length when the sections are nested, allowing it to be conveniently carried, for example, in a rider's backpack. Also, if desired, the fender system can be left in place on the bicycle in the nested position, forming a short, compact arc which does not significantly increase the wind resistance of the bicycle or detract from its sporty appearance.

According to the invention, there is provided a telescoping bicycle fender having three interconnecting, telescoping fender sections. The first, fixed, section has sleeves proximate each end which support and permit longitudinal sliding of the second and third sections to extend outward from each end of the first section. The three sections nest together when the second and third sections are not extended. The first section is attached at each of its ends to the frame of the bicycle. In addition, the second fender section, which slides over the front portion of the wheel, also attaches to the bicycle frame when it is extended fully forward.

DESCRIPTION OF THE PREFERRED EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
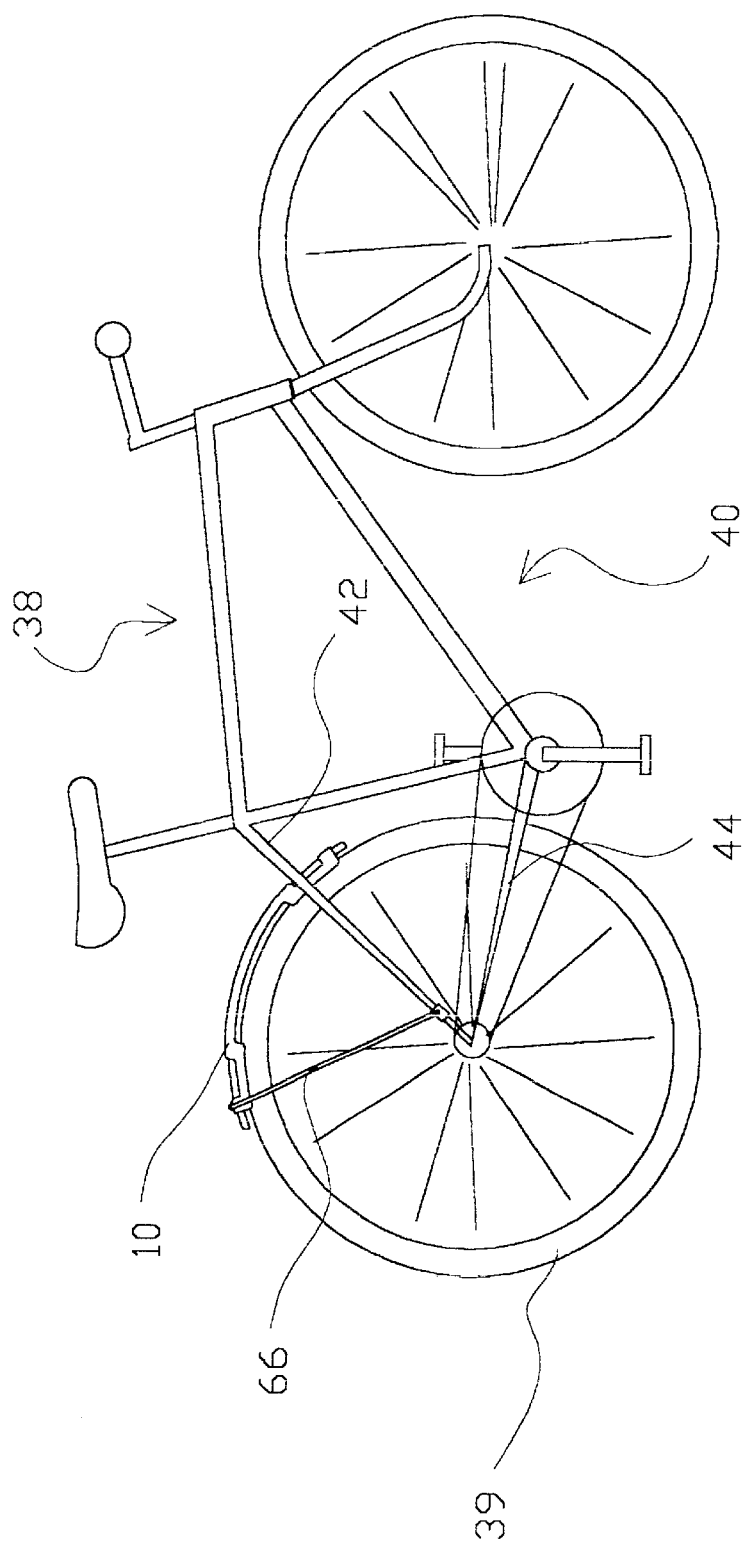
FIG. 1 is a perspective view of the telescoping bicycle fender of the invention mounted on a bicycle, with the sliding sections in their nested position.

FIG. 1 shows bicycle 38 having a frame 40 with the telescoping bicycle fender 10 of the invention, here shown in its nested or unextended position, attached adjacent to rear wheel 39 of the bicycle. The telescoping bicycle fender 10 is shown in its extended position in FIG. 2. For clarity of illustration, the only parts of the bicycle shown in FIG. 2 are the rear parts of frame 40 to which the telescoping bicycle fender attaches, including the two seat stays 42 and the two chain stays 44.

Figure 2:
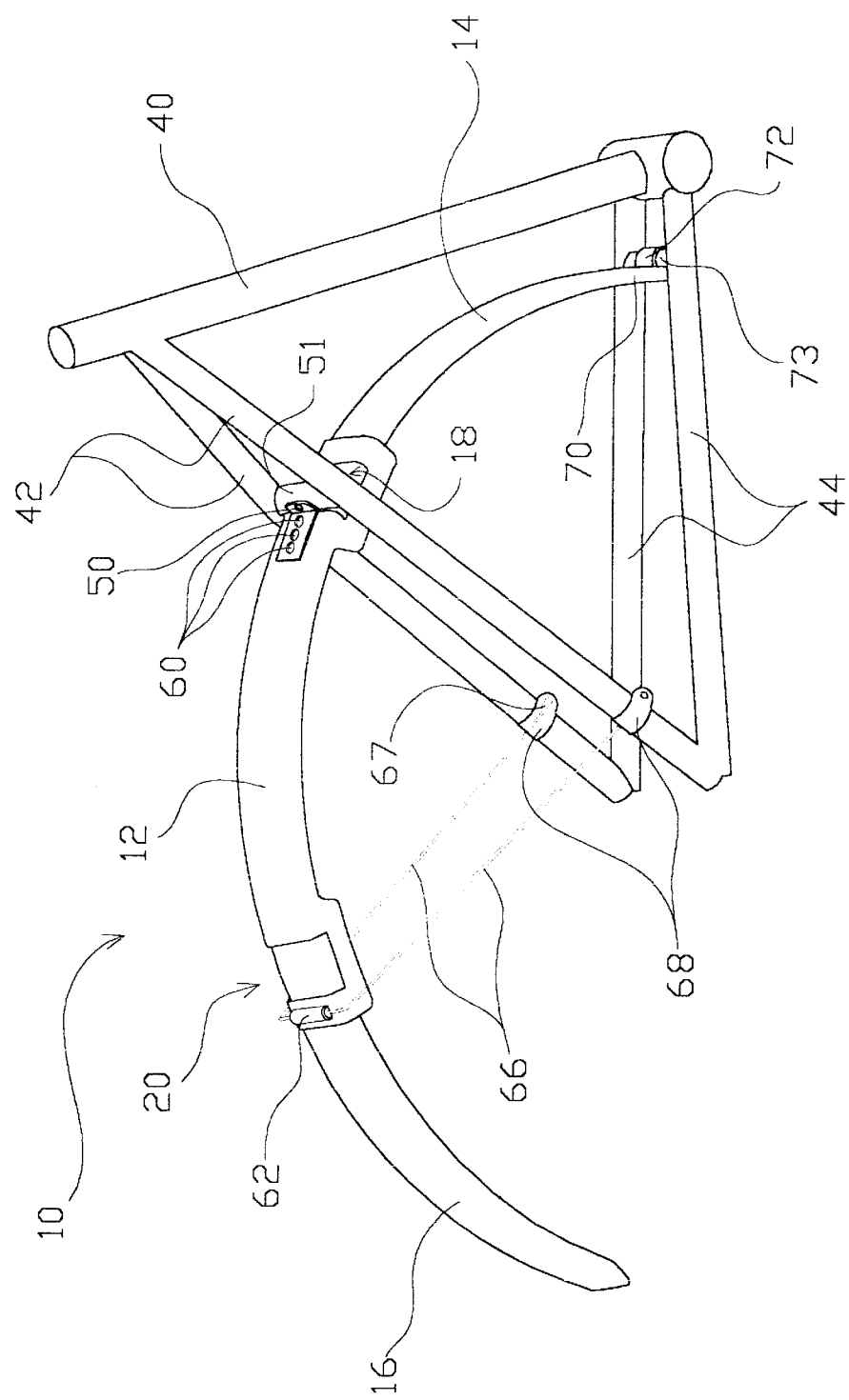
FIG. 2 shows a partial bicycle frame with the telescoping bicycle fender attached thereto, with the sliding sections in their fully extended position.
Figure 3:
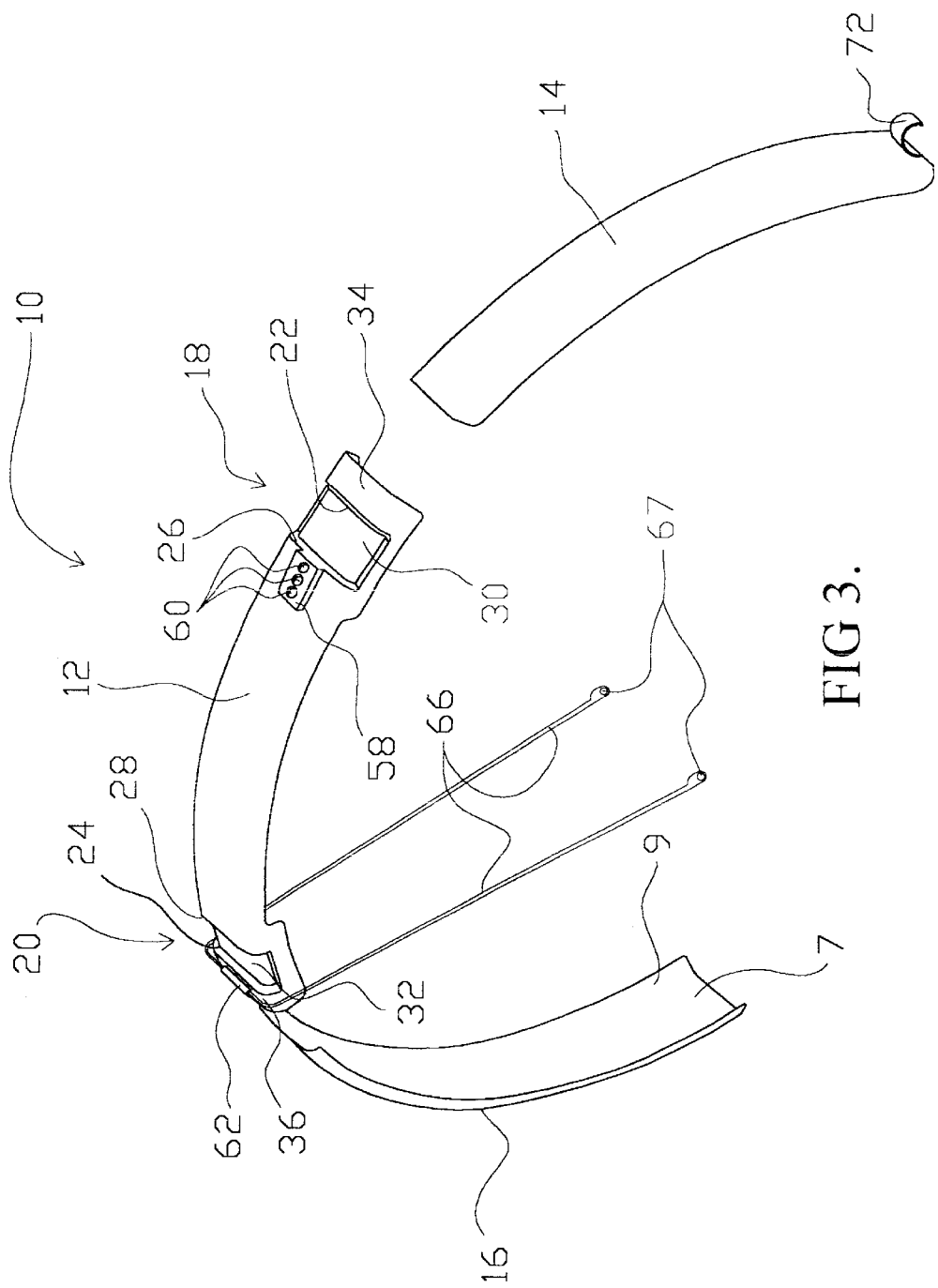
FIG. 3 is a perspective view showing the fixed fender section and the two sliding fender sections in a disassembled condition.
Figure 5:
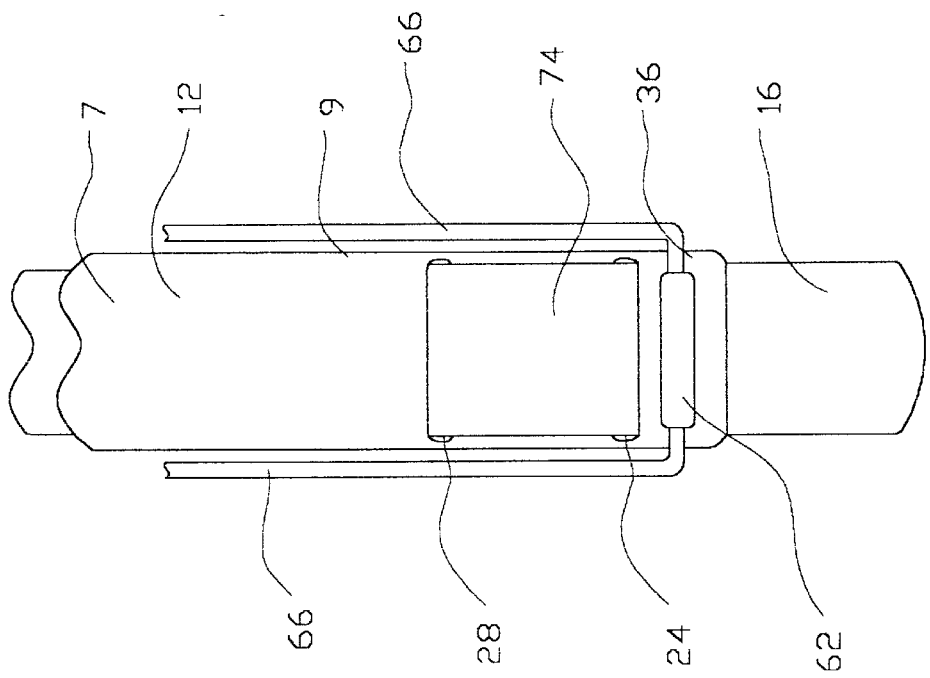
FIG. 5 is a top plan view of a portion of the bicycle fender.

Referring particularly to FIGS. 2 and 3, the telescoping bicycle fender 10 comprises principally a fixed section 12 and two sliding sections 14, 16. Sliding section 14, extends forward from fixed section 12, and sliding section 16 extends rearward therefrom. The three sections have a large radius back portion 7 and transverse sides 9 thereof to extend partially around the bicycle tire. The fender sections can be made of any suitable material. Preferably they are made of a plastics material, such as ABS, by means of injection molding. The plastics material selected should be strong, lightweight, UV resistant, easily processed by injection molding and resistant to warping. It should also have high impact strength and good rigidity. A suitable thickness for the fixed section 12 is about 0.040 inches; a suitable thickness for the sliding sections is about 0.030 inches.

Figure 6:
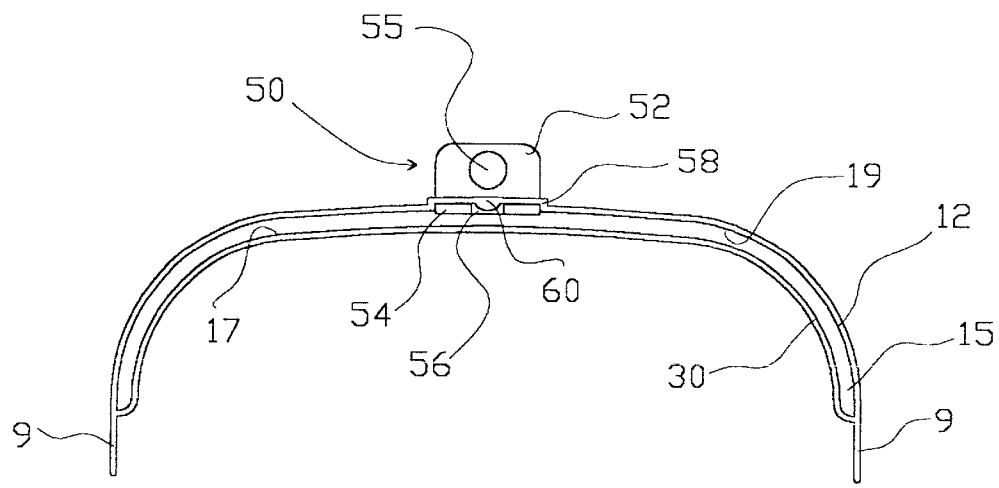
FIG. 6 is a cross-sectional view through the fixed fender section.

The sliding sections can be moved by hand by a sliding motion between the fully extended position shown in FIG. 2 and the nested position of FIG. 1, in which the two sliding sections are nested within fixed section 12. The fixed section 12 has two sleeves 18, 20 configured near its longitudinal ends, permitting sliding sections 14, 16, respectively to connect to the fixed section 12 and slide relative thereto. Sleeves 18 and 20 are identical to each other in configuration. Sleeve 18 comprises transverse slots 22, 26 with a segment 30 of the fixed section 12 between the slots. Segment 30 is positioned radially inward of the rest of the fixed section 12. A radially-extending space 15, best seen in FIG. 6, is accordingly present between the radially outer surface 17 of segment 30 and the inner surface 19 of the adjacent parts of the fixed section 12. Sliding section 14 fits in this space 15, held therein between the inner surface 19 of the fixed section 12 (i.e. the inner surface of the longitudinal end portion 34 of the fixed section and the portion of the fixed section on the opposite side of slot 26) and the outer surface 17 of segment 30. Similarly, the sleeve 20 comprises slots 24 and 28 and segment 32 therebetween. Sliding fender section 16 is positioned to slide through the slots and over the segment 32, held in place between the radially outer surface of segment 32 and the inner surface of the adjacent fixed section 12, at end 36 thereof and the portion of the fixed section on the opposite side of slot 28. The dimensions and configuration of the slots are such as to give a snug but sliding fit of the sliding sections 14 and 16 in their respective sleeves. When both of the sliding sections are moved to their nesting position, both sliding sections are nested within fixed section 12 and accordingly, one of sliding sections 14, 16 is nested within the other sliding section.

Although it is preferred that the sliding sections nest fully within the fixed section, such full nesting is not necessary for the invention as it is acceptable for a portion of each sliding section to protrude from the fixed section when the sliding sections are in the nesting position. In this specification, therefore, references to "nested" includes both full and partial nesting of the sliding sections in the fixed section.

Referring to FIGS. 1, 2 and 6, the telescoping bicycle fender 10 is attached to the bicycle frame at three points when in the nested position and at four points when extended.

First, the fixed section 12 is attached by bracket 50 to the bicycle frame, preferably to a frame member 51 extending between the two seat stay members 42. Bracket 50 is preferably an L-shaped member having a first arm 52 which fastens to frame member 51, and a second arm 54 which fits in slot 26 under a slightly raised portion 58 of the fixed section 12, which is configured to accommodate the bracket without interfering with the movement of sliding section 14 in space 15. Raised portion 58 has a set of three downwardly-extending dimples 60 and arm 54 of bracket 50 has a set of three openings 56 configured to engage the dimples 60 when the bracket 50 is placed in position in slot 26. This releasably holds the front end of fixed section 12 in place, permitting rapid removal and reinstallation by hand without the use of tools. Bracket 50 is intended to be permanently affixed to frame member 51 by means of a bolt through bore 55 of arm 54.

Figure 7:
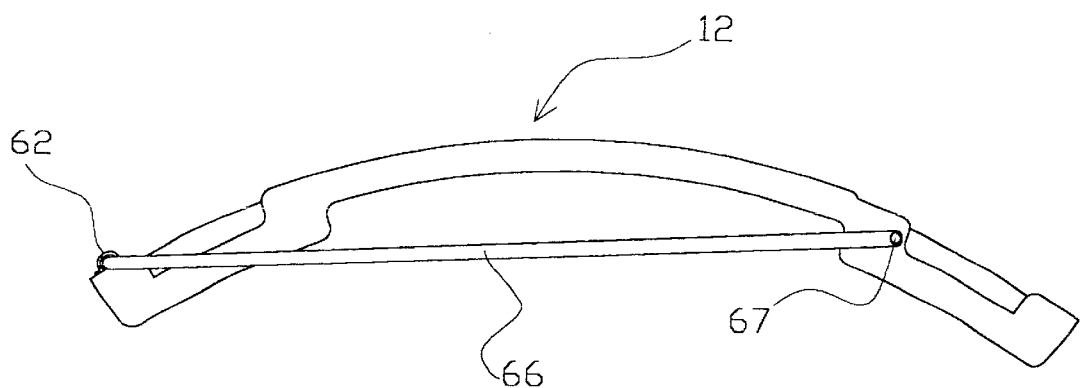
FIG. 7 is a side elevational view of the telescoping bicycle fender with the sliding sections in their nested position and with the rear bracket folded in a storage position.

Second, the rearward end of the fixed section 12 is attached to the bicycle frame by means of a rear bracket comprising a flexible metal U-shaped bracket 66 which is pivotally mounted through bracket 62 on end 36 of the fixed section 12. Bracket 66 has free ends with loops 67 which fit over projections on mounting brackets 68 on the inner side of the bottom end of the seat stay members of the frame. The bracket 66 can be detached from the bicycle frame by hand, without tools, by squeezing the free ends of the bracket 66 together, thus sliding the loops 67 off the mounting brackets 68. When the telescoping bicycle fender 10 is removed from the bicycle frame, the pivotal attachment of the U-shaped bracket permits it to fold into a relatively compact position against the fixed section 12, as shown in FIG. 7.

Third, the telescoping bicycle fender 10 also attaches to the bicycle frame at a fourth point, when the sliding section 14 is fully extended. As best seen in FIGS. 2 and 3, free end 70 of sliding section 14 integrally includes clip 72, which can be releasably attached to the bicycle frame member 73 which extends between chain stays 44. This attachment stabilizes the front end of the bicycle fender when in the extended position. In order to retract the sliding section 14, the section is simply slid by hand towards the fixed section 12, pulling clip 72 off frame member 73.

Figure 4:
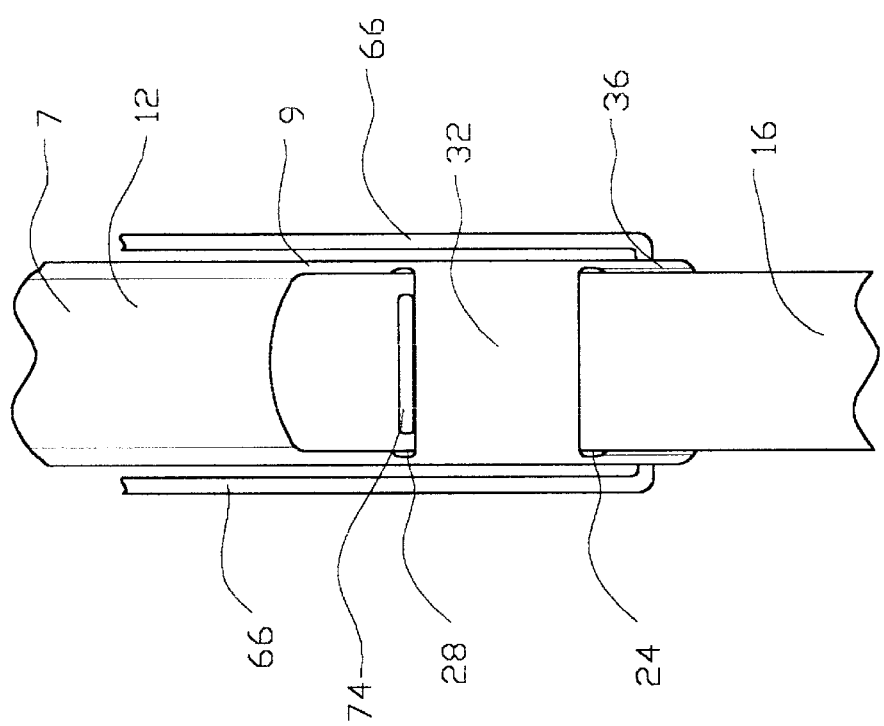
FIG. 4 is a bottom plan view showing a portion of the fixed fender section and a sliding fender section connected together, with the sliding section fully extended.

The sliding sections include a stop 74, shown in FIG. 4, which abuts against segment 30 or 32 to define a maximum extension of the sliding sections. When fully extended, the sections extend around a substantial part of the bicycle wheel, preferably about 180 degrees.

Figure 8:
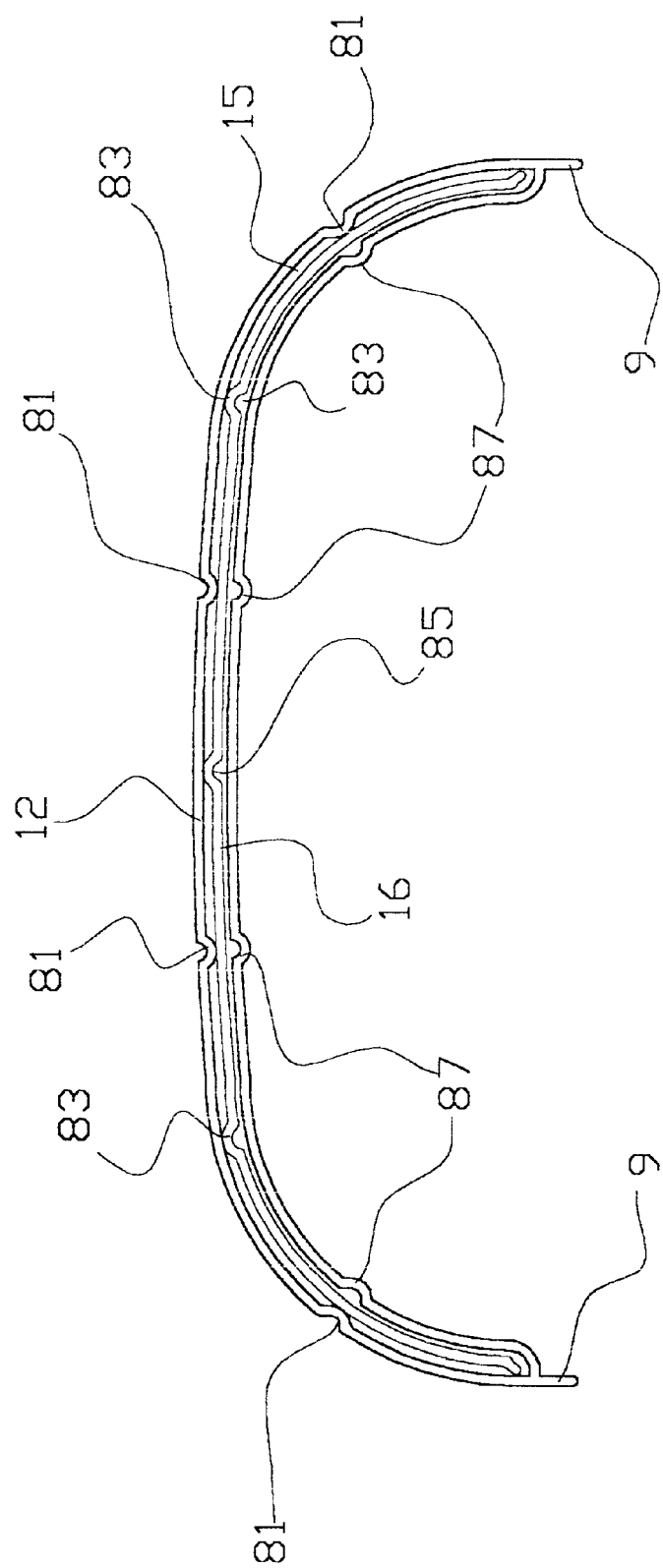
FIG. 8 is a cross-sectional view through a second embodiment of the telescoping bicycle fender, in which the fixed and sliding fender sections have longitudinal ribs.

According to a second preferred embodiment of the invention, the fixed and sliding sections of the bicycle fender may have a plurality of small longitudinal ribs. FIG. 8 illustrates this embodiment, which differs from the embodiment of FIGS. 1–7 only in that both the fixed section 12 and sliding sections have longitudinal ribs 81 on their concave side and the sliding sections 14, 16 have longitudinal ribs 83 on their convex side. Channels 85 are formed on the side of the fender sections opposite to the ribs. Ribs 87 are provided on the concave side of segments 30 and 32. These ribs and channels serve both to increase the rigidity of the fender sections and to minimize the surface to surface contact area between them. Dirt on the surfaces tends to be pushed into the channels as the sliding sections are moved, thus minimizing the interference caused by dirt in the movement of the sliding fender sections.

Although the invention has been described in terms of various embodiments, it is not intended that the invention is limited to these embodiments. Various embodiments within the scope of the invention will be apparent to those skilled in the art. For example, various configurations of connector may be provided for attaching the fender sections to the bicycle frame, such as various snap-on type brackets and other fittings which permit easy removal of the fender from the frame.

What is claimed is:

1. A telescoping bicycle fender for attachment to a bicycle frame, comprising:
   (a) first, second and third interconnected fender sections;
   (b) said first section having a first sleeve therein proximate a first end thereof, configured to support said second fender section and to permit longitudinal sliding movement therethrough of said second fender section, from a first position in which said second fender section is nested within said first fender section to a second position in which said second section extends longitudinally beyond said first end of said first fender section, wherein said first sleeve comprises a longitudinally-spaced pair of transverse slots in said first fender section, sized and configured to receive said second fender section, and a segment of said first fender section between said slots configured to engage an inner surface of said second fender section and to slidingly hold said second fender section between said segment and an inner surface of said first fender section;
   (c) said first section having a second sleeve therein proximate a second end thereof, configured to support said third fender section and to permit longitudinal sliding movement therethrough of said third fender section from a first position in which said third fender section is nested within said first fender section to a second position in which said third fender section extends longitudinally beyond said second end of said first fender section, wherein said second sleeve comprises a longitudinally-spaced pair of transverse slots in said first fender section, sized and configured to receive said third fender section, and a segment of said first fender section between said slots configured to engage an inner surface of said first fender section and to slidingly hold said third fender section between said segment and an inner surface of said first fender section; and (d) connectors on said first fender section to attach said first fender section to said bicycle frame.

2. A telescoping bicycle fender according to claim 1 wherein said connector comprises a first bracket on said first fender section proximate said first sleeve and a second bracket on said first fender section proximate said second sleeve.

3. A telescoping bicycle fender according to claim 2 wherein said first bracket comprises an L-shaped member having an arm adapted to fit between said first and said second fender sections and wherein said first fender section has engagement means adapted to releasably engage said arm.

4. A telescoping bicycle fender according to claim 2 wherein said second bracket comprises a U-shaped bracket for releasable connection to said bicycle frame.

5. A telescoping bicycle fender according to claim 4 wherein said U-shaped bracket is pivotally attached to said first fender section.

6. A telescoping bicycle frame according to claim 1 wherein said second fender section further comprises a stop adapted to engage said first segment of said first sleeve to limit the longitudinal extension of said second fender section.

7. A telescoping bicycle fender according to claim 1 wherein said third fender section further comprises a stop adapted to engage said segment of said second sleeve to limit the longitudinal extension of said third fender section.

8. A telescoping bicycle fender according to claim 1 wherein a free end of said second fender section in said second position is adapted to attach to said bicycle frame.

9. A telescoping bicycle fender according to claim 1 wherein said fender sections include a plurality of longitudinal ribs and channels adapted to minimize surface contact between said fender sections during said sliding movement of said second and third fender sections.

* * * * *